United States Patent
Crowle et al.

(10) Patent No.: US 8,861,501 B2
(45) Date of Patent: Oct. 14, 2014

(54) TIMING SOURCE

(75) Inventors: Martin Richard Crowle, Devon (GB); Timothy Michael Edmund Frost, Plymouth (GB); Robertius Laurentius Van Der Valk, Capelle aan den Ijssel (NL)

(73) Assignee: Microsemi Semiconductor Limited, Wiltshire (GB)

( * ) Notice: Subject to any disclaimer, the term of this patent is extended or adjusted under 35 U.S.C. 154(b) by 1622 days.

(21) Appl. No.: 11/723,394

(22) Filed: Mar. 19, 2007

(65) Prior Publication Data

US 2007/0223484 A1 Sep. 27, 2007

Related U.S. Application Data

(60) Provisional application No. 60/783,853, filed on Mar. 21, 2006.

(30) Foreign Application Priority Data

Nov. 16, 2006 (GB) .................................. 0622836.5

(51) Int. Cl.
*H04J 3/06* (2006.01)
*H04L 12/403* (2006.01)
*H04L 12/751* (2013.01)

(52) U.S. Cl.
CPC .............. *H04J 3/0664* (2013.01); *H04J 3/0682* (2013.01); *H04J 3/0632* (2013.01); *H04L 12/403* (2013.01); *H04L 45/10* (2013.01)
USPC ........... 370/350; 370/324; 370/345; 370/503; 370/504; 370/510; 370/511; 370/515; 370/520

(58) Field of Classification Search
None
See application file for complete search history.

(56) References Cited

U.S. PATENT DOCUMENTS

| | | | |
|---|---|---|---|
| 5,428,645 A | 6/1995 | Dolev et al. | |
| 6,532,274 B1 | 3/2003 | Ruffini | |
| 6,608,821 B1 * | 8/2003 | Gendel | 370/280 |
| 6,633,590 B1 * | 10/2003 | Garofalo et al. | 370/507 |
| 7,079,554 B2 * | 7/2006 | Peled | 370/514 |
| 7,369,491 B1 * | 5/2008 | Beshai et al. | 370/230 |
| 2003/0035444 A1 * | 2/2003 | Zwack | 370/503 |
| 2003/0093267 A1 | 5/2003 | Leichtling et al. | |
| 2004/0062278 A1 * | 4/2004 | Hadzic et al. | 370/503 |
| 2004/0076187 A1 | 4/2004 | Peled | |
| 2006/0056460 A1 | 3/2006 | Currivan | |
| 2006/0133406 A1 * | 6/2006 | Homer et al. | 370/442 |
| 2006/0190594 A1 | 8/2006 | Jorgenson et al. | |

FOREIGN PATENT DOCUMENTS

| | | |
|---|---|---|
| EP | 1 455 473 A2 | 9/2004 |
| EP | 1455473 A2 | 9/2004 |
| EP | 1 394 975 A3 | 8/2005 |

* cited by examiner

*Primary Examiner* — Faruk Hamza
*Assistant Examiner* — Aixa A Guadalupe-Cruz
(74) *Attorney, Agent, or Firm* — Arent Fox LLP (57) ABSTRACT

A timing source is provided for sending timing information via a packet network. The source comprises a first clock for generating the timing information and a packet forming section for forming a sequence of packets. An output section in the form of a packet launch control section transmits the packets via the network as packet bursts, each of which comprises a plurality of packets with the intervals between consecutive packets of each burst being less than the intervals between consecutive packets. A time-stamping section inserts into each packet a transmission time derived from the timing information generated by the clock.

25 Claims, 5 Drawing Sheets

TIMING SOURCE

CROSS-REFERENCE TO RELATED APPLICATION

The application claims benefit under 35 U.S.C. §119 to U.S. Provisional Patent Application No. 60/783,853 filed Mar. 21, 2006, entitled "Timing Source For Distributing Timing Information", and also claims the benefit of priority from Great Britain Application 0622836.5 filed on Nov. 16, 2006. The entire contents of these applications are incorporated herein in its entirety by reference.

TECHNICAL FIELD

The present invention relates to a timing source for sending timing information via a packet network. Such a source is applicable in particular, though not necessarily, to the synchronisation of clocks associated with time division multiplexed transmission links interconnected by a packet network.

BACKGROUND

Communication networks typically make use of one of two well established transmission mechanisms; circuit switched transfer and packet switched (or just packet) transfer. Older systems tend to use the former, and in the main use time division multiplexing to divide the time domain, for a given frequency band, into time slots of equal duration. Circuits are defined by grouping together identical slot positions in successive time frames. Packet networks typically do not allocate fixed resources to transmitters, but rather route packets of data on a best efforts basis, using destination address information contained in packet headers, and network switches and routers. Packet networks are becoming more popular amongst network operators as they often provide better performance, and are more cost effective to install and maintain, than equivalent circuit switched networks.

Figure 1:
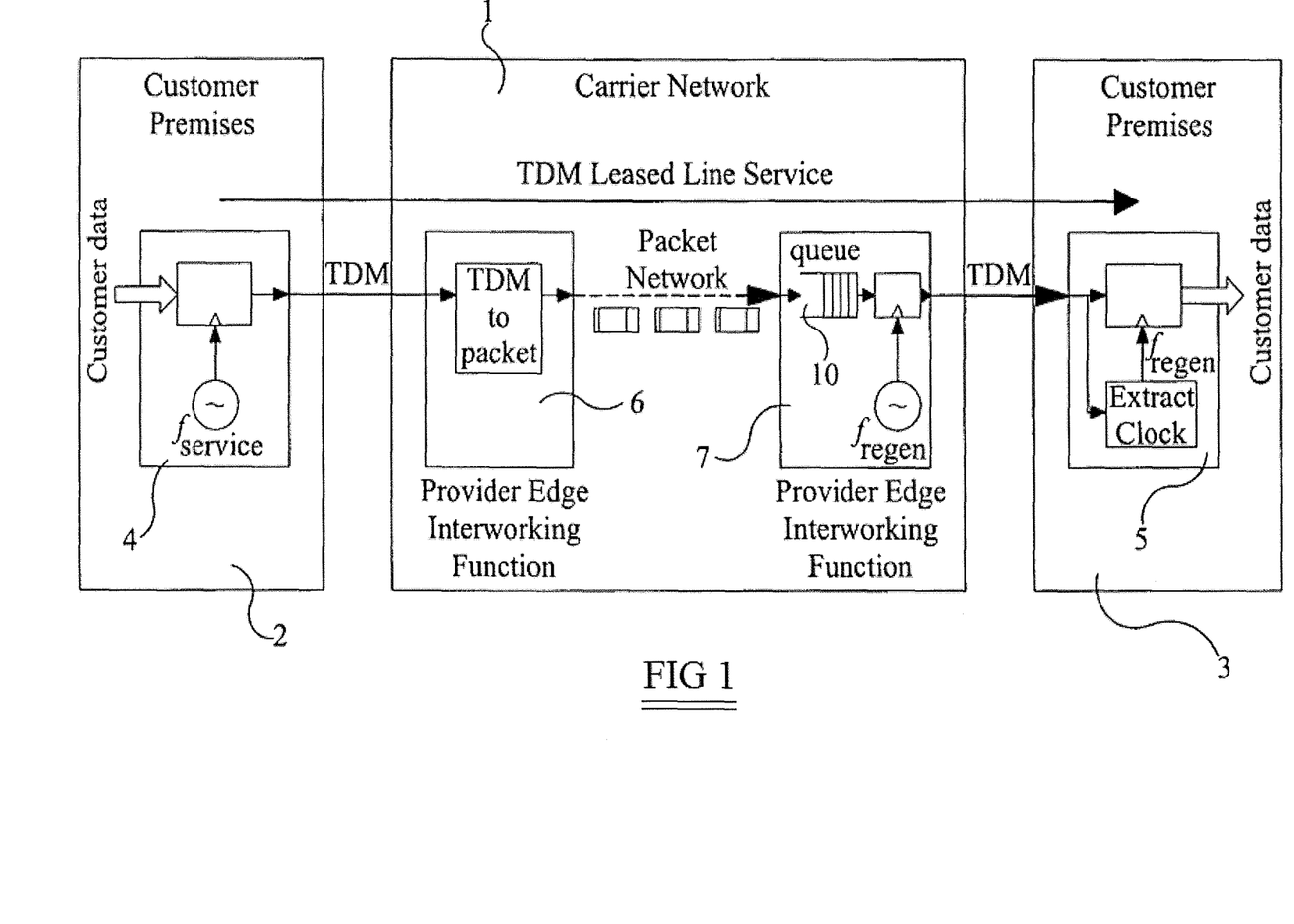
FIG. 1 is a block schematic diagram of a known arrangement for sending timing information via a packet network.

Traditionally, telecommunication networks have made use of time division multiplexed (TDM) circuits to interconnect network switches (or exchanges). However, for the above mentioned reasons of performance and cost, many operators and leased line providers (who provide bandwidth to service providers) are moving towards replacing TDM circuits with packet networks. In many cases, switch to switch "sessions" will be provided entirely over packet networks. However, it is likely that, for many years to come, some operators will continue to rely upon TDM circuits to provide all or at least a part of the networks. This will necessitate interworking between packet networks and TDM "legacy" equipment. FIG. 1 of the accompanying drawings illustrates schematically a carrier network 1 which is a packet switched network such as an Ethernet, ATM, or IP network. The carrier network provides leased line services to interconnect first and second customer premises 2,3, both of which make use of TDM transmitters 4,5 to handle multiple information streams. The nature of these streams is unimportant, although they could for example be voice calls, videoconference calls, or data calls. In order to facilitate the interconnection of the TDM streams, the carrier network 1 must emulate appropriate TDM circuits.

TDM links are synchronous circuits with a constant (transmission) bit rate governed by a service clock operating at some predefined frequency. In contrast, in a packet network there is no direct link between the frequency at which packets are sent from an ingress port and the frequency at which they arrive at an egress port. With reference again to FIG. 1, in order to provide TDM circuit emulation, interface nodes 6,7 at the edges of the packet network must provide interworking between the TDM links and the packet network in such a way that the TDM link at the egress side is synchronised with the TDM link at the ingress side. In other words, the TDM service frequency ($f_{service}$) at the customer premises 2 on the ingress side must be exactly reproduced at the egress of the packet network ($f_{regen}$). The consequence of any long-term mismatch in these frequencies will be that the queue 10 at the egress of the packet network 1 will either fill up or empty, depending upon on whether the regenerated clock ($f_{regen}$) is slower or faster than the original clock ($f_{service}$), causing loss of data and degradation of the service. Also, unless the phase of the original clock ($f_{service}$) is tracked by that of the regenerated clock ($f_{regen}$), the lag in frequency tracking will result in small but nonetheless undesirable changes to the operating level of the queue 10 at the egress.

Some reliable method for synchronising both the frequency and phase of the clock at the egress of a packet network to those of the clock at the TDM transmitter must be provided. One approach is to use some algorithm to recover the transmitting clock frequency and phase from timestamps incorporated into packets by the sender, taking into account the transmission delay over the packet network. As the transmission time over the packet network is unpredictable for any given packet, an adaptive algorithm might be used. For example, some form of averaging might be employed to take into account variations in the transmission delay. For ATM, ITU standard I.363.1 and ATM Forum standard af-vtoa-0078 explain the concept of an adaptive clock recovery mechanism in general terms.

EP 1455473 discloses a technique for synchronising the clock at an egress side of a packet network to the clock of a TDM transmitter. According to this technique, the egress clock is adjusted in accordance with variations in the minimum transmit time of packets received in consecutive time periods.

The quality of the reference clock recovered at the timing destination is subject to degradation based on the other traffic on the packet network and on the packet rate used to transfer the timing information. In general, the packet rate and packet size are set as low as possible to conserve the bandwidth consumed in transporting the clock.

SUMMARY

According to a first aspect of the invention, there is provided a timing source for sending timing information via a packet network, comprising a first clock for generating the timing information, a packet forming section for forming a sequence of packets, an output section for transmitting the packets of the sequence via the network as packet bursts, each of which comprises a plurality of packets with the time difference between consecutive packets of the same burst being less than the time difference between consecutive bursts, and a time-stamping section for inserting into each packet of the sequence a transmission time derived from the timing information generated by the first clock.

The output section may be arranged to vary the time difference between transmitting consecutive packets of each burst.

The output section may be arranged to vary the number of packets in each burst.

The output section may be arranged to vary the sizes of the packets.

The output section may be arranged to vary the time difference between consecutive bursts. The output section may be arranged to vary the transmission times of the packets or bursts so as to reduce transit times to a destination. The output section may be arranged to vary the transmission times in accordance with measured transit times. The transit times may be measured at the destination. As an alternative, the transit times may be for packets received from the destination via a return path and may be measured at the source.

The output section may be arranged to transmit the bursts or the packets of each burst at or close to an interval substantially equal to the product of a positive integer and a frame rate of a time division multiplex path in the network.

The output section may be arranged to transmit the bursts or the packets of each burst at or close to an interval substantially equal to the product of a positive integer and 125 microseconds.

The packets may contain padding and may be for conveying timing information only.

The packets may contain payload data associated with the timing information. The packet-forming section may be arranged to form the packets from incoming data of substantially constant data rate on a communication path. The incoming data may represent real-time events. The incoming data may comprise audio and/or video. The communication path may comprise a further time division multiplex path.

According to a second aspect of the invention, there is provided a combination of a source according to the first aspect of the invention and a destination apparatus comprising a second adjustable clock and an arrangement for adjusting the second clock into synchronism with the first clock.

The adjusting arrangement may comprise a destination time-stamping arrangement for determining the local time of arrival of each packet of the sequence and a control circuit for adjusting the second clock as a function of differences in packet transit times. The packet transit times may be minimum packet transit times in consecutive time periods.

According to a third aspect of the invention, there is provided a method of sending timing information via a packet network, comprising generating timing information, forming a sequence of packets, transmitting the packets of the sequence via the network as packet bursts, each of which comprises a plurality of packets with the time difference between consecutive packets of the same burst being less than the time difference between consecutive bursts, and inserting into each packet of the sequence a transmission time derived from the timing information.

It is thus possible to provide an arrangement which improves the propagation time of packets containing timing information through a packet network. For example, by making use of knowledge of possible synchronous circuits, such as TDM circuits, within a packet network, the transit time of packets may be reduced and/or made more consistent. Where a clock is regenerated at a destination, the clock regeneration may be made more consistent and/or more accurate.

DETAILED DESCRIPTION

Figure 2:
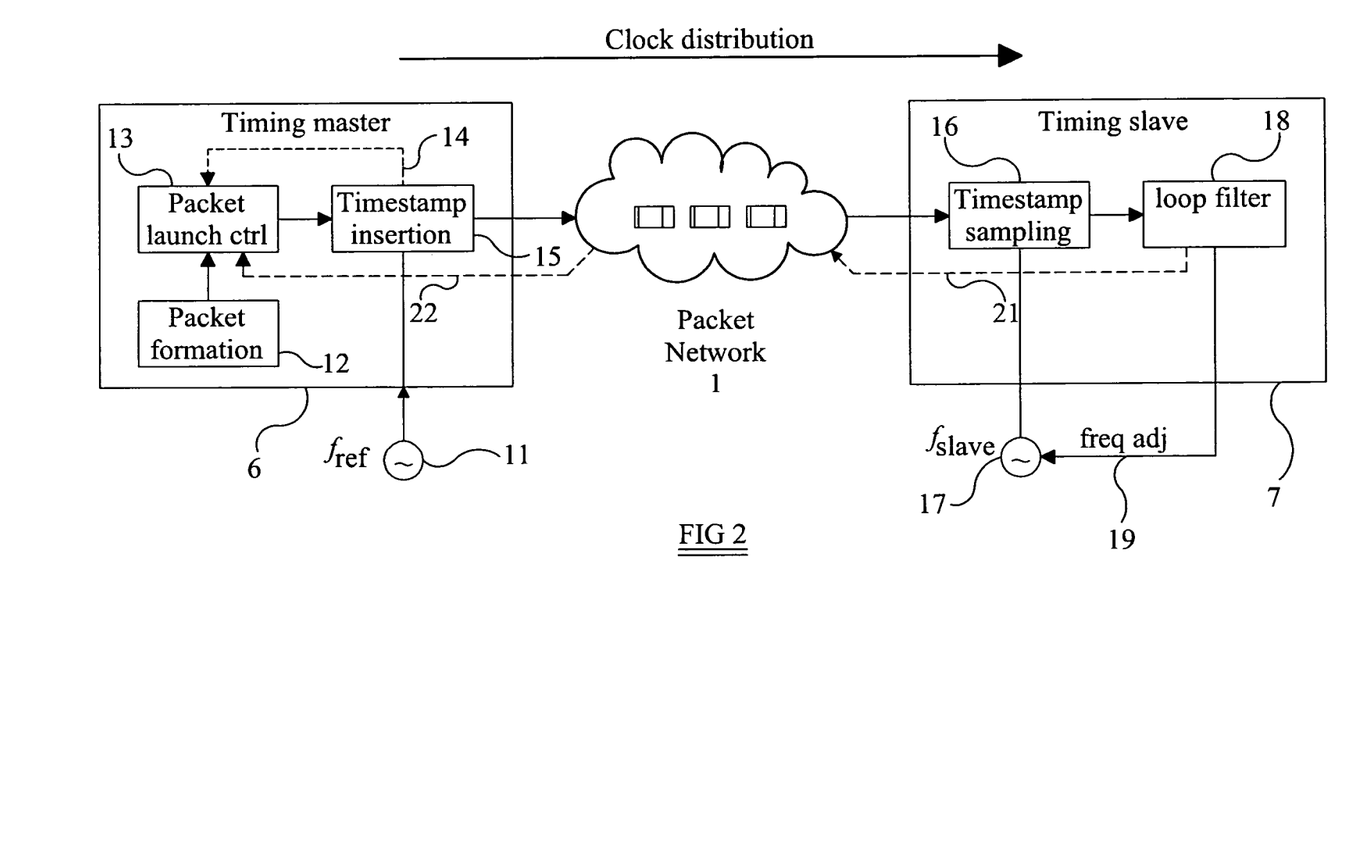
FIG. 2 is a block schematic diagram of an arrangement for sending timing information via a packet network and including a timing source constituting an embodiment of the invention.

As shown in FIG. 2, the timing source for sending timing information via a packet network 1 is provided within a transmitter 6, which may form an interface at the edge of the carrier network as illustrated in FIG. 1 or which may be within a customer premises connected to the network. The timing source comprises a first clock 11, which generates a stable reference frequency $f_{ref}$. The clock 11 may generate the reference frequency in isolation or this may be derived from or synchronised to an incoming data flow, such as a TDM data stream for transmission across the packet network 1.

The timing source 6 comprises a packet forming section 12, which forms packets for containing the timing information to be sent via the packet network 1. For example, the packets may be formed with "padding data" in cases where it is merely required to send the timing information without the accompaniment of useful data. Alternatively, the packet forming section 12 may form packets containing useful data, for example from a TDM data stream representing voice calls, video conferencing or data. It is also possible to send a combination of useful data and padding data in the "timing packets".

The packets formed by the section 12 are supplied to a packet launch control section 13, which controls the launch times of the packets. In particular, the section 13 organises the packets as packet bursts with each burst comprising a plurality of individual packets. The time difference between consecutive packets of the same burst is less than the time difference between consecutive bursts. The packets are sent with a timing determined by a timing master 14 derived from the reference frequency generated by the clock 11.

The packets launched by the control section 13 are transmitted to the packet network 1 via a time stamp insertion section 15. The transmission time of each packet is derived from the clock 11 and inserted into the packet as it is transmitted to the network 1. In a typical example of such a system, it is required to send 100 timing packets per second to the destination 7 and these may, for example, be organised as 25 bursts of 4 packets per burst.

The destination 7 is shown as comprising part of the interface 7 shown in FIG. 1 but may alternatively be provided within the customer premises illustrated at 3 in FIG. 1. As the timing packets arrive from the packet network 1, each packet is time-stamped by a time stamp sampling section 16. The differences between the time stamps inserted in the sections 15 and 16 provide a measure of the transit delay of each packet across the packet network 1. The time stamping information in the destination 7 is derived from a second clock 17, which is illustrated in FIG. 2 as being synchronised to the first clock 11 but which may alternatively be a free-running reference clock. The packets from the section 16 are supplied to a control arrangement, illustrated as a loop filter 18, for supplying a frequency adjust signal via a control line 19 to a frequency control input of the clock 17. For example, the frequency $f_{slave}$ of the clock 17 may be synchronised to the reference frequency $f_{ref}$ of the clock 11 in accordance with the techniques disclosed in EP 1455473. The output of the second clock 17 thus recreates the timing information created by the clock 11 and may be used for any suitable purpose. For example, in the case of a TDM data stream which has been converted to packet form and sent across the network 1, the regenerated clock signal may be used to control outputting of the payload data, for example as another TDM data stream. This arrangement therefore allows synchronous data to be transferred across an asynchronous packet network 1 and data to be appropriately reassembled at the destination 7. Such an arrangement is particularly useful for transmitting real time data, for example representing a voice call or a video conference.

As mentioned hereinbefore, packet networks 1 frequently contain legacy TDM paths which make use of a TDM mechanism when forwarding packets. In such packet networks, there is a defined window during which packets may be transmitted irrespective of their reception time. The arrangement shown in FIG. 2 allows this underlying property of the network 1 to be used to advantage in sending timing information across the network.

Figure 3:
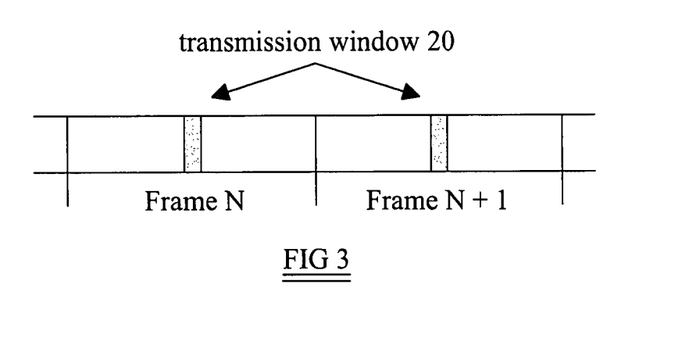
FIG. 3 is a diagram illustrating a frame structure of part of the packet network of FIG. 2.
Figure 4:
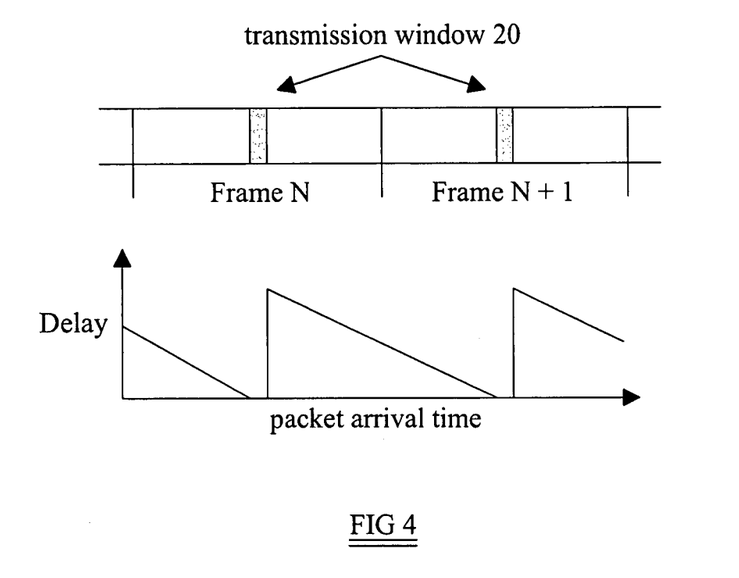
FIG. 4 is a diagram illustrating the effect of different packet sending times on packet delay across the network.

FIG. 3 illustrates part of the timing structure of an underlying TDM mechanism within the packet network 1. The data passing through this path are organised as frames with the Nth and (N+1)th frames being illustrated in FIG. 3. For a particular path through the network 1 for carrying the packets from the source 6 to the destination 7, there is a transmission window 20 in each frame. Packets following this path are transmitted only during the transmission windows 20. Thus, any packet arriving within a transmission window 20 will be forwarded with minimal delay whereas packets for transmission along the same path but arriving outside the transmission windows 20 will be subjected to a delay as illustrated in FIG. 4. In particular, the delay is a maximum for any packet arriving immediately after one of the transmission windows 20 and reduces linearly to the minimum delay immediately before the start of the next transmission window 20. For example, where the underlying TDM mechanism within the network 1 has a frame rate of 8 kHz, each frame has a duration of 125 microseconds. If each transmission window 20 has an active duration of 16 microseconds, then packets will be subjected to greater than the minimum delay if they arrive during the 109 microsecond gap between the transmission windows 20.

Figure 5:
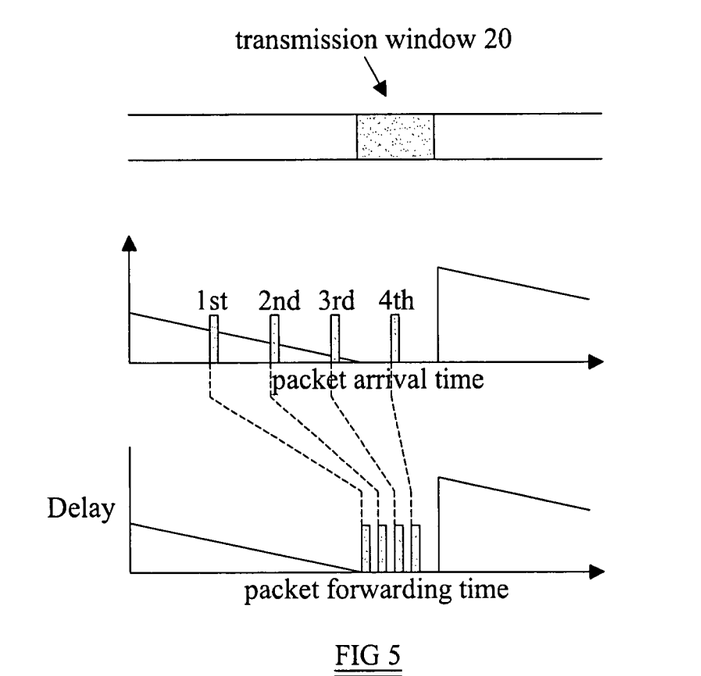
FIG. 5 illustrates the effect on packet delay of sending bursts of packets by the timing source shown in FIG. 2.

In order to improve the quality of the recovered clock at the destination 7, it is desirable for the packets to be transferred during or soon before the transmission windows 20. This is achieved by the source 6 illustrated in FIG. 2 by forming the packets as bursts, as illustrated in FIG. 5. In this example, each burst comprises four packets and the bursts are forwarded to the packet network 1 at a timing such as to arrive immediately before and/or within the transmission window 20. In this particular example, the $1^{st}$ to $4^{th}$ packets of each burst arrive with timings such that the $1^{st}$ to $3^{rd}$ packets arrive immediately before the transmission window 20 whereas the $4^{th}$ packet arrives during the transmission window 20, as illustrated by the middle diagram in FIG. 5. The packets are queued by the underlying TDM mechanism and are transmitted within the transmission window 20 such that the transit delays of the timing packets across the network 1 are substantially less than would be achieved by arbitrary transmission times. Although the $4^{th}$ packet is slightly delayed by the queuing of the first to third packets which arrived before the transmission window 20, the individual delays in transit times of the packets are reduced and are more consistent with each other. Further improvements may be made, for example by configuring the burst size such that the transmission time does not exceed the interval between the packets in the burst.

Figure 6:
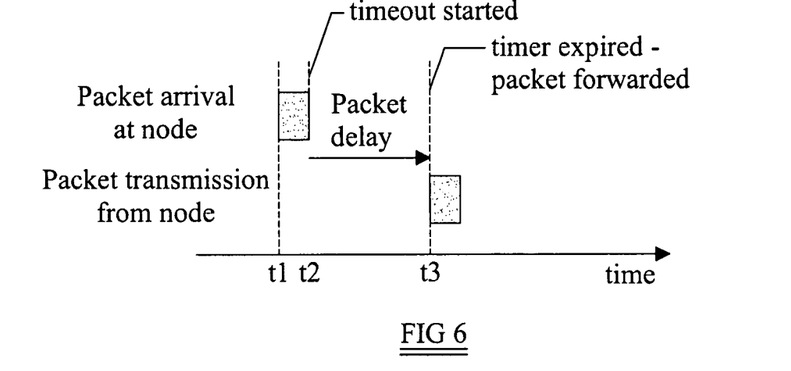
FIG. 6 illustrates another underlying mechanism which may be present within the packet network shown in FIG. 2.

The packet burst technique also provides improved performance for packet networks having underlying scheduling algorithms which attempt to limit the maximum packet latency across the network. FIG. 6 illustrates the effect of such a mechanism. A packet travelling along a particular path through the network arrives at a network element employing scheduling at a time t1. When the whole packet has arrived at a time t2, a timer or "timeout" is started and the packet is held in a buffer until the timer expires at a time t3. The packet is then forwarded from the network element to continue along its path.

Figure 7:
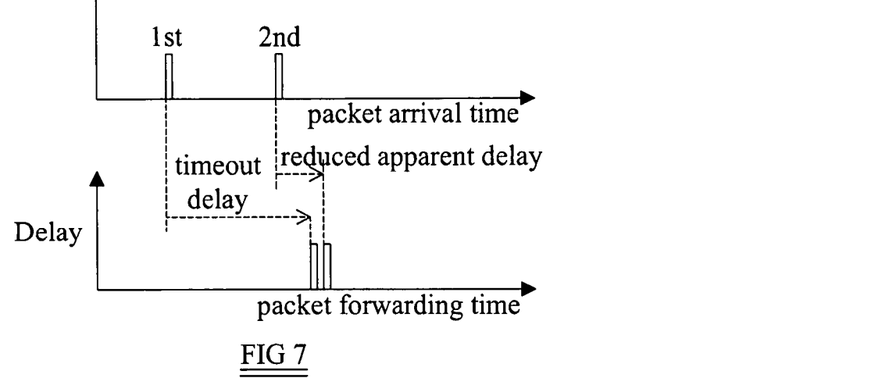
FIG. 7 is a diagram illustrating how packet bursts can be arranged to benefit from the mechanism illustrated in FIG. 6.

By arranging the packets in bursts as described hereinbefore, the transit times of at least some timing packets may be substantially reduced. For example, as illustrated in FIG. 7, by starting a timeout delay upon arrival of a first packet and then sending a second packet within the timeout delay, the second packet suffers a much reduced apparent delay through the element and hence through the network. Thus, transmitting packets as bursts reduces the transit delays of many of the timing packets. This may be achieved simply by providing the packet burst arrangement without any knowledge of the underlying network mechanisms, for example by grouping the packets of each burst relatively closely together in time. However, if any knowledge of the network structure is available and includes information about timeout delays, the packet timings within the bursts may be selected to reduce or minimise transit times across the network 1.

It is also possible to choose the time intervals between packets in each burst such that consecutive packets are spaced apart in time by at least one frame of the underlying TDM structure. For example, at some level, the TDM frames generally have an 8 kHz alignment, which gives an underlying frame period or "granularity" of 125 microseconds or a multiple thereof. Where the transmission mechanism is based on a multi-frame mechanism, the frame rate is typically at least 500 Hz and is faster than the expected timing packet rate for a packet timing stream, which would typically be of the order of 100 packets per second.

Figure 8:
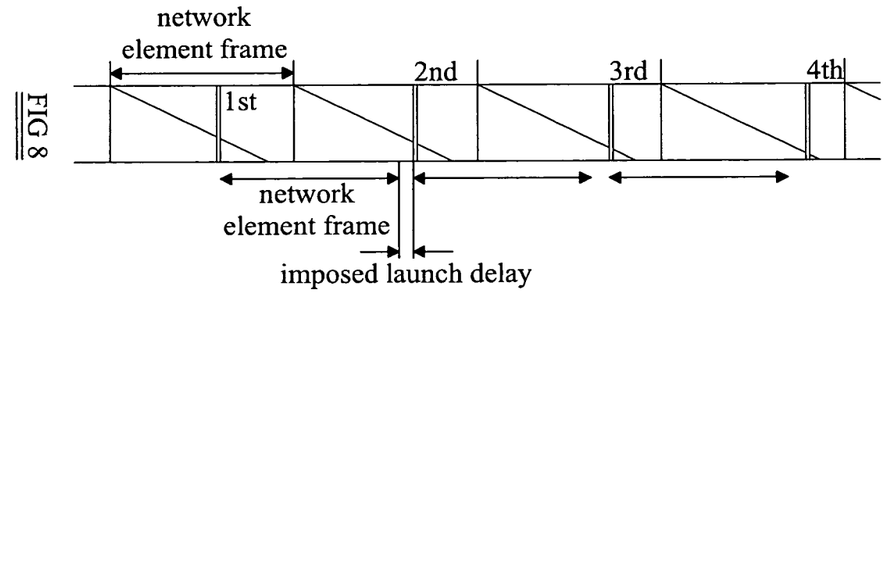
FIG. 8 is a diagram illustrating packet timing within bursts relative to an underlying mechanism within the packet network of FIG. 2.

FIG. 8 illustrates an example of such an arrangement, in which the consecutive packets of each burst are spaced apart by approximately one TDM frame period. The timing packets are transmitted as 100 packets per second in the form of 25 bursts of 4 packets.

In general, the actual frame timing of the underlying TDM mechanism will not be known at the source 6. However, the source 6 may be operated in a standalone or "open loop" mode by varying the timing of the bursts or of the packets within each burst. In other words, instead of attempting to synchronise the transmission times with the underlying TDM mechanism timing, the packet and/or burst timings are varied continuously or in a step-wise manner so that at least some of the packets or bursts will benefit from reduced transit times by coinciding with the TDM frame slots which provide the smallest transmit delays.

In an alternative "closed loop" mode of operation, the timing source 6 makes use of packet transit delay information supplied via a return path illustrated by the broken lines 21 and 22 in FIG. 2. For example, the section 18 at the destination 7 determines which of the timing packets have the smallest delays and returns this information to the packet launch control section 13 in the source 6. The section 13 can then use this information to determine the optimum transmission times for future packets and/or packet bursts.

For example, when the path from the source 6 to the destination 7 is established, the timing source 6 may initially operate in a "search mode" such that the timing varies with respect to any underlying TDM or other mechanism within the packet network 1. This is illustrated in FIG. 8 for an arrangement which attempts to transmit the packets of each burst with a frame interval between consecutive packets of an underlying TDM mechanism. For the case where 100 packets are sent across the network 1 and the packets are sent as 25 groups of 4 packets per second, the packets are launched at multiples of the maximum frame rate, which is 2 millisecond intervals, plus an offset which is equal to the time interval to evaluate the network element transfer delay. The offset may, for example, be 10 microseconds, which is much greater than any actual time shift due to clock inaccuracies during the interval (typically about 0.4 microseconds). If the actual frame rate is equal to 500 Hz, there will be a 1 millisecond shift during each second so that it may take a maximum of 2 seconds to be within 10 microseconds of the timing for minimum delay.

During this mode, the destination 7 returns information about the packet delays via the path 21, 22 so that the packet launch control section 13 can determine the optimum times for sending the packets of each burst so as to arrive at or immediately before the timing windows 20 of the underlying TDM mechanism. The appropriate timing may then be used for further timing packet transmission during the normal operating mode but with timing adjustments being made in accordance with transit delays determined in the destination 7 and returned via the path 21, 22.

If appropriate, the number of packets in each burst may be varied, for example in accordance with the transit delays observed at the destination. This may be done within the overall requirement of a fixed number of packets per second or the number of packets per second may also vary according to the prevailing conditions.

The sizes of the timing packets may be fixed or may vary, for example among packets in each burst. Such variation in packet size may lead to the packets progressing at different rates through nodes of the network 1.

It is also possible to transmit multiple packet sequences or bursts from the source. For example, this may be used where different network paths encounter different window and frame sizes so that the packet transmission may generally support the networks or the packets may be sent to specific nodes with specific profiles.

It may also be possible to make use of bi-directional traffic so as to determine the characteristics of a network in order to adjust the sending profile appropriately. For example, if the network is symmetric, then it may be possible to infer widow sizes and frame periods by observing received packets to allow packet transmission timings to be improved or optimised for reduced transit delays.

What is claimed is:

1. A timing source for sending timing information via a packet network, said source comprising:
   a first clock for generating said timing information;
   a packet forming section for forming a sequence of packets;
   an output section for transmitting said packets of said sequence via said network as packet bursts, each of which comprises a plurality of said packets with a time difference between consecutive packets of a same burst being less than a time difference between consecutive bursts, and said time difference between packets in the same burst being greater than a length of said packet, so that individual delays in transit times of at least some packets of the sequence are arranged to be minimized and to be consistent with each other across the network; and
   a time-stamping section for inserting into each said packet of said sequence a transmission time derived from said timing information generated by said first clock.

2. A source as claimed in claim 1, in which said output section is arranged to vary said time difference between transmitting said consecutive packets of each said burst.

3. A source as claimed in claim 1, in which said output section is arranged to vary a number of said packets in each said burst.

4. A source as claimed in claim 1, in which said output section is arranged to vary the sizes of the packets.

5. A source as claimed in claim 1, in which said output section is arranged to vary said time difference between said consecutive bursts.

6. A source as claimed in claim 2, in which said output section is arranged to vary transmission times of said packets so as to reduce transit times to a destination.

7. A source as claimed in claim 6, in which said output section is arranged to vary said transmission times in accordance with measured said transit times.

8. A source as claimed in claim 7, in which said transit times are measured at said destination.

9. A source as claimed in claim 7, in which said transit times are for packets received from said destination via a return path and are measured at said source.

10. A source as claimed in claim 5, in which said output section is arranged to vary transmission times of said bursts so as to reduce transit times to a destination.

11. A source as claimed in claim 10, in which said output section is arranged to vary said transmission times in accordance with measured said transit times.

12. A source as claimed in claim 11, in which said transit times are measured at said destination.

13. A source as claimed in claim 11, in which said transit times are for packets received from said destination via a return path and are measured at the said source.

14. A source as claimed in claim 1, in which said output section is arranged to transmit one of said bursts and said packets of each said burst at an interval equal to a product of a positive integer and a frame rate of a time division multiplex path in said network.

15. A source as claimed in claim 1, in which said output section is arranged to transmit one of said bursts and said packets of each said burst at an interval equal to a product of a positive integer and 125 microseconds.

16. A source as claimed in claim 1, in which said packets contain padding data and are for conveying said timing information only.

17. A source as claimed in claims 1, in which said packets contain payload data associated with said timing information.

18. A source as claimed in claim 17 in which said packet-forming section is arranged to form said packets from incoming data of a constant data rate on a communication path.

19. A source as claimed in claim 18, in which said incoming data represent real-time events.

20. A source as claimed in claim 19, in which said incoming data comprise at least one of audio and video.

21. A source as claimed in claim 18, in which said communication path comprises a time division multiplex path.

22. A combination of:
   a timing source for sending timing information via a packet network, said source comprising a first clock for generating said timing information, a packet forming section for forming a sequence of packets, an output section for transmitting said packets of said sequence via said network as packet bursts, each of which comprises a plurality of said packets with a time difference between consecutive packets of a same burst being less than a time difference between consecutive bursts, and said time difference between packets in the same burst being greater than a length of said packet, so that individual delays in transit times of at least some packets of the sequence are arranged to be minimized and to be consistent with each other across the network, and a time-stamping section for inserting into each said packet of said sequence a transmission time derived from said timing information generated by said first clock; and a destination apparatus comprising a second adjustable clock and an arrangement for adjusting said second clock into synchronism with said first clock.

23. A combination as claimed in claim 22, in which said adjusting arrangement comprises a destination time-stamping arrangement for determining a local time of arrival of each said packet of said sequence and a control circuit for adjusting said second clock as a function of differences in packet transit times.

24. A combination as claimed in claim 23, in which said packet transit times are minimum packet transit times in consecutive time periods.

25. A method of sending timing information via a packet network, said method comprising the steps of:

generating said timing information; forming a sequence of packets;

transmitting said packets of said sequence via said network as packet bursts, each of which comprises a plurality of said packets with a time difference between consecutive packets of a same burst being less than a time difference between consecutive bursts and said time difference between packets in the same burst being greater than a length of said packet, so that individual delays in transit times of at least some packets of the sequence are arranged to be minimized and to be consistent with each other across the network; and inserting into each said packet of said sequence a transmission time derived from said timing information.

* * * * *